(12) United States Patent
Dong

(10) Patent No.: US 7,894,024 B2
(45) Date of Patent: Feb. 22, 2011

(54) LIQUID CRYSTAL PANEL

(75) Inventor: Xue Dong, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 128 days.

(21) Appl. No.: 12/274,531

(22) Filed: Nov. 20, 2008

(65) Prior Publication Data

US 2009/0322996 A1 Dec. 31, 2009

(30) Foreign Application Priority Data

Jun. 30, 2008 (CN) .................. 2008 1 0126031

(51) Int. Cl.
G02F 1/1335 (2006.01)
G02F 1/1339 (2006.01)
(52) U.S. Cl. ...................... 349/106; 349/155
(58) Field of Classification Search ............... 349/156, 349/56, 58, 104, 106, 107, 108, 155
See application file for complete search history.

(56) References Cited

U.S. PATENT DOCUMENTS

| 5,815,232 A * | 9/1998 | Miyazaki et al. ............. 349/155 |
| 5,969,784 A * | 10/1999 | Miyazaki et al. ............. 349/155 |
| 7,630,051 B2 * | 12/2009 | Lee ............................. 349/155 |
| 2005/0117092 A1 * | 6/2005 | Park et al. ................... 349/106 |
| 2005/0190337 A1 * | 9/2005 | Park et al. ................... 349/155 |
| 2007/0097311 A1 * | 5/2007 | Li et al. ....................... 349/155 |
| 2009/0322996 A1 * | 12/2009 | Dong .......................... 349/106 |

FOREIGN PATENT DOCUMENTS

| JP | 2004-239982 A | 8/2004 |
| KR | 1020050019244 A | 3/2005 |
| KR | 1020070109202 A | 11/2007 |
| KR | 1020080002434 A | 1/2008 |

* cited by examiner

Primary Examiner—Brian M Healy
(74) Attorney, Agent, or Firm—Ladas & Parry LLP

(57) ABSTRACT

The present invention relates to a liquid crystal display panel, including an array substrate and a color filter substrate bonded together. The color filter substrate is provided with primary photo spacers, and the top end of the primary photo spacers are provided at the sub-pixel of the array substrate, and one or more sub-pixels corresponds to one primary photo spacer, the primary photo spacers are grouped into at least two sets, the primary photo spacers in each set have a same prescribed location and a same top end shape. The primary photo spacers in the different set have different prescribed locations or different top end shapes. In the liquid crystal display panel of the invention, since the different primary photo spacers are provided at the different locations, therefore, if the alignment deviation occurs when the array substrate and the color filter substrate are bonded together, the alignment deviations of the primary photo spacers at the different prescribed locations will be compensated for each other, so as to ensure the uniformity of the cell thickness.

14 Claims, 17 Drawing Sheets

| | |
|---|---|
| ▦ | Third primary photo spacer 13 |
| ▤ | Fourth primary photo spacer 14 |
| ▨ | Fifth primary photo spacer 15 |

Sixth primary photo spacer 16

Seventh primary photo spacer 17

LIQUID CRYSTAL PANEL

FIELD OF THE INVENTION

The present invention relates to a liquid crystal display. In particular, the invention relates to a structure of photo spacers for the liquid crystal display.

BACKGROUND OF THE INVENTION

The liquid crystal display is mainly composed of polarization plates, an array substrate, a color filter substrate, a liquid crystal layer and the like. The array substrate and the color filter substrate are bonded together to form a liquid crystal cell structure, in which the liquid crystal layer is filled. The polarization plates are adhered to the back surface of the array substrate and the color filter substrate, respectively. The thickness of the liquid crystal layer, also referred as a cell thickness, may have a great influence on the light adjustment of the liquid crystal. Consequently, during the manufacturing of the liquid crystal display, it is important to ensure the uniformity of the cell thickness for realizing a high quality liquid crystal display.

In order to ensure the uniformity of the cell thickness, a method of providing a spacer is typically employed in the prior art. Currently, the spacer can be classified into two categories of ball spacer (BS) and photo spacer depending on its shape.

The ball spacers are typically distributed on the array substrate or the color filter substrate by a spraying method. After the panel is completed, the relative uniform cell thickness is realized depending on the uniformity of the size of the ball spacers. However, since the distributing process of the ball spacers is highly random, it is difficult to control the uniformity of the density; in turn it is difficult to achieve a desired level for the uniformity of the cell thickness, and the adverse effects such as the light scattering will occur.

In order to overcome the shortcomings of the ball spacers, a photo spacer process is employed in the prior art instead. The photo spacers are formed by a lithography process on the color filter substrate during manufacturing the color filter substrate and the positions of the photo spacers on the color filter substrate can be accurately controlled, so as to increase the uniformity of the cell thickness and improve contrast.

In the current design of the photo spacers, a structure of combination of primary photo spacers and secondary photo spacers is typically employed. The primary photo spacers are used as the main part for maintaining the uniformity of the cell thickness, and are positioned at higher elevation on the surface of the array substrate, e.g., on the thin film transistors (TFT) of the array substrate. During manufacturing the panel, the primary spacers are subjected to a large deformation, and play an important role in maintaining the uniformity of the cell thickness. In contrast, the secondary photo spacers are typically positioned at lower elevation on the surface of the array substrate, e.g., on the gate lines. During manufacturing the panel, the secondary photo spacers are subjected to a small deformation, if not at all, therefore, the secondary photo spacers have a minor effect on maintaining the uniformity of the cell thickness. The secondary photo spacers are mainly used to prevent excessive stress applied on the primary photo spacers due to the small supporting area of the primary photo spacers when the liquid crystal display is under a relatively large external force, so as to avoid occurrence of the unrecoverable change of the cell thickness or damage of the structure the photo spacers.

FIG. 1 is a schematic view of the channel location in the array substrate in the prior art. The reference "A" shows the position of the channel. FIG. 2 is a schematic view showing the primary and secondary photo spacers in the photo spacer design in the prior art. The reference "1" designates the primary photo spacer and the reference "2" designates the secondary photo spacer. As for the design for the photo spacer in the prior art, a sub-pixel is typically adopted as a reference, and the primary photo spacers are positioned at a specific location relative to the sub-pixel. Since the TFT has a higher elevation with a relatively large area in the sub-pixel, and becomes one of the major location for placing the primary photo spacers. However, the surface of the TFT is not flat due the presence of the channels. Although the specific location of the photo spacer in the sub-pixel is selected, the alignment accuracies for the different sub-pixels are different, so that the actual contact area between the primary photo spacers and the TFT will vary when the contact position between them are different. Therefore, the deviation of the alignment accuracy between the color filter substrate and the array substrate in the panel will lead to a difference in the support force by the primary photo spacers.

Under the current manufacturing condition for the liquid display panel, the assemble accuracy between the color filter substrate and the array substrate is typically in an order of several microns, i.e., an inevitable deviation of several microns may present for relative position between the array substrate and the color filter substrate assembled together. Therefore, after the array substrate and the color filter substrate are assembled, the actual position of the primary photo spacers relative to the array substrate will also deviate from the predetermined specific location unavoidably. Under the condition of the alignment deviation for several microns, the area in which the primary photo spacers overlap with the TFT channel will vary, so that the variation in the actual deformation amounts for the primary photo spacers will occur and the uniformity of the cell thickness will be decreased.

In addition, the width of the TFT channel may be 3-6 µm, and the size of the photo spacer may be about 6-17 µm. In the case of one drop filling (ODF) process is employed, in order to ensure the allowable deviation of the liquid crystal drop amount, the support area of the primary photo spacer is typically required to be as small as possible, and the size of the primary photo spacer is required to be as small as possible. However, due to the presence of the above problems, when the size of the primary photo spacer is reduced, the influence on variation of the support force by the primary photo spacer with the alignment deviation will become greater. FIGS. 3, 4 and 5 shows distribution views of the support area on the TFT under the following conditions in the prior art: the diameters of the primary photo spacers are 12 µm, 10 µm and 9 µm, all of the primary photo spacers are at the same prescribed location, and the alignment accuracy of the primary photo spacers is 5 µm. In FIGS. 3, 4 and 5, the horizontal ordinate and the vertical ordinate show the ranges of alignment accuracy for the array substrate and the color filter substrate (unit: µm), respectively, with the different colors showing the actual support areas for the different primary photo spacers (an average value of 1 is defined for the support area of the primary photo spacer 1 within an alignment accuracy of 5 µm).

On one hand, for the ODF process, the design of the primary photo spacer is directed to have smaller size and lower density, so as to ensure a large allowable deviation of the liquid crystal drop amount and increase the yield of the panel; on the other hand, with the limitation of the current process, when the primary photo spacer is provided on the TFT, although all of the primary photo spacers are designed to have the same prescribed specific location within the sub-pixels, the actual positions of the primary photo spacers within the sub-pixel will be different due to the different alignment deviations in the different positions inside the panel. Therefore, the actual support force by the primary photo spacers at the different positions inside the panel will be different with the different alignment deviations due to the presence of the TFT channel, and the smaller the size of the primary photo spacer is, the larger difference of the actual support force will be. Consequently, quality problems such as touch mura will be more likely to occur.

SUMMARY OF THE INVENTION

In the present invention, there is provided a liquid crystal display panel so that the uniformity of actual support force by the primary photo spacers is increased within the range of the alignment accuracy of the array substrate and the color filter substrate while the size of the primary photo spacers is reduced.

According to one embodiment of the present invention, there is provided a liquid crystal display panel. The liquid crystal display panel can include an array substrate and a color filter substrate, which are bonded together. The color filter substrate is provided with primary photo spacers, and the top end of the primary photo spacers are provided at the sub-pixel of the array substrate. One or more sub-pixels correspond to one primary photo spacer, the primary photo spacers are grouped into at least two sets, the primary photo spacers in each set have a same prescribed location and the same top end shape; the primary photo spacers in the different set have different prescribed locations or different top end shapes.

The primary photo spacers can be grouped into first and second sets for the array substrate having thin film transistors with a straight line type channel, for example. Each of the primary photo spacers in the first set is at the upper side of the thin film transistor channel of the corresponding sub-pixel; and each of the primary photo spacers in the second set is at the lower side of the thin film transistor channel of the corresponding sub-pixel. In one row on the array substrate, the primary photo spacers in the first set and the primary photo spacers in the second set are provided at the sub-pixels of the array substrate alternatively; and in one column on the array substrate, the primary photo spacers in the first set and the primary photo spacers in the second set are provided at the sub-pixels of the array substrate alternatively.

The primary photo spacers can be grouped into third, fourth and fifth set for the array substrate having thin film transistors with a "U" type channel. The primary photo spacers in the third set is at the left side of the thin film transistor channel of the corresponding sub-pixel; each of the primary photo spacers in the fourth set is at the middle of the thin film transistor channel of the corresponding sub-pixel; and each of the primary photo spacers in the fifth set is at the right side of the thin film transistor channel of the corresponding sub-pixel. In one row on the array substrate, the primary photo spacers in the third set, the primary photo spacers in the fourth set and the primary photo spacers in the fifth set are arranged at the sub-pixels of the array substrate in this order repeatedly; and in one column on the array substrate, the primary photo spacers in the third set, the primary photo spacers in the fourth set and the primary photo spacers in the fifth set are arranged at the sub-pixels of the array substrate in this order repeatedly.

In the at least two sets of primary photo spacers mentioned above, the number of the primary photo spacers in the different sets may be different.

In the liquid crystal display panel of the invention, since the different primary photo spacers are provided at the different locations, therefore, if the alignment deviation occurs when the array substrate and the color filter substrate are bonded together, the alignment deviations of the primary photo spacers at the different prescribed locations will be compensated for each other, so as to ensure the minimum variation of the overall contact area between the primary photo spacer and the array substrate, therefore, the variation of the overall support force by the primary photo spacers in the panel is minimized. Furthermore, by optimizing the arrangement from of the primary photo spacers in each set in the panel, the uniformity of the support force by the primary photo spacers in the panel can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWING

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

Figure 1:
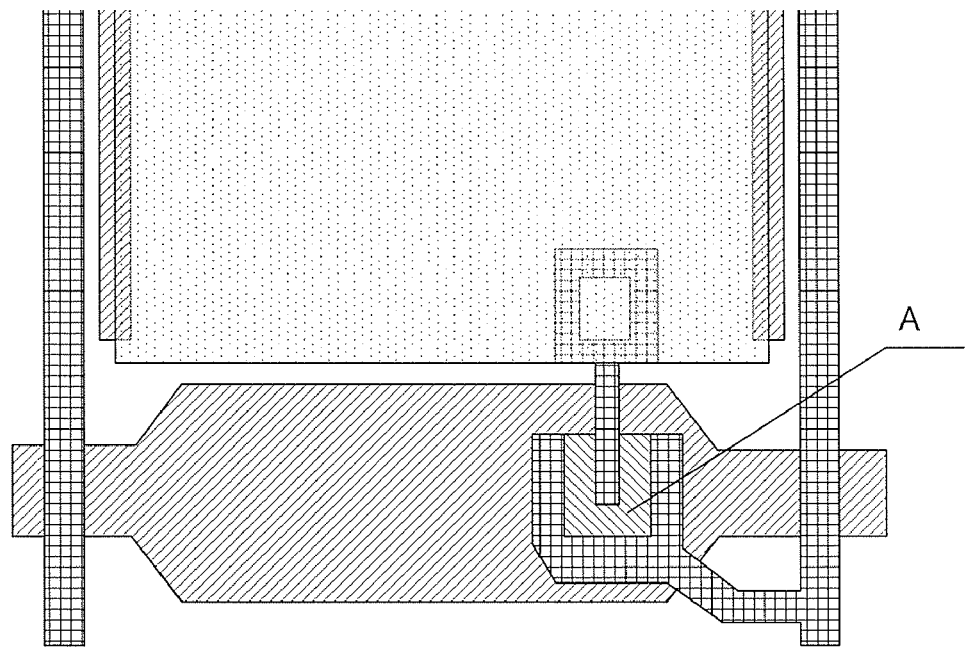
FIG. 1 is a schematic view of the position of a channel in an array substrate in the prior art.
Figure 2:
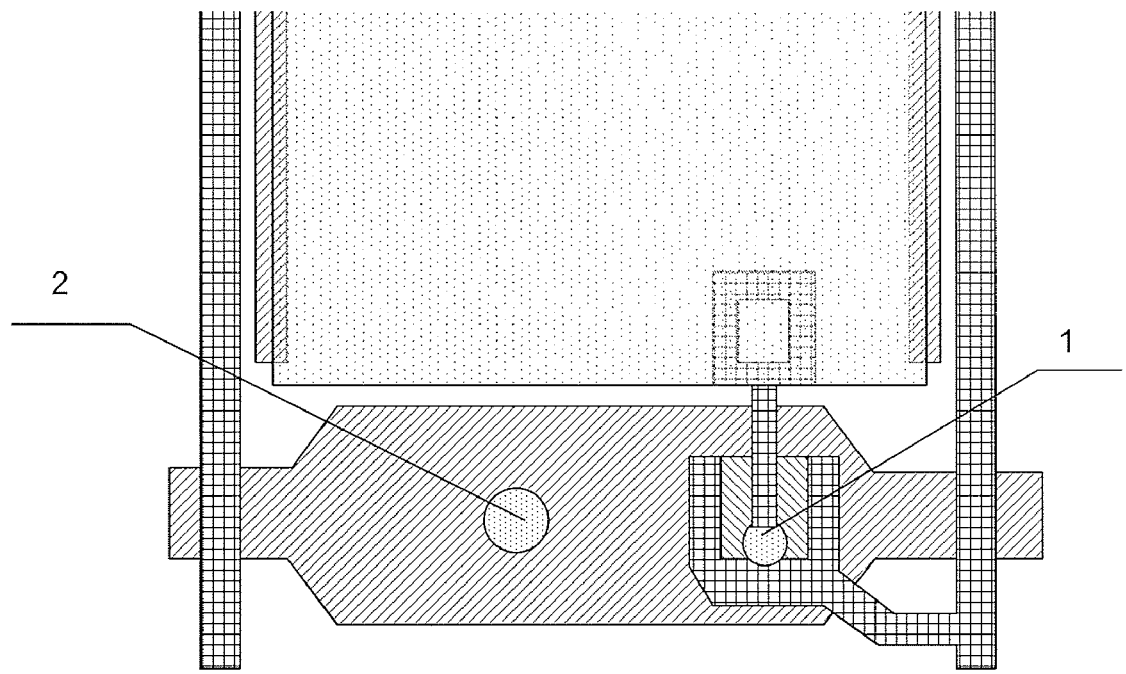
FIG. 2 is a schematic view of a primary and a secondary photo spacers in the design of the photo spacers in the prior art.
Figure 3:
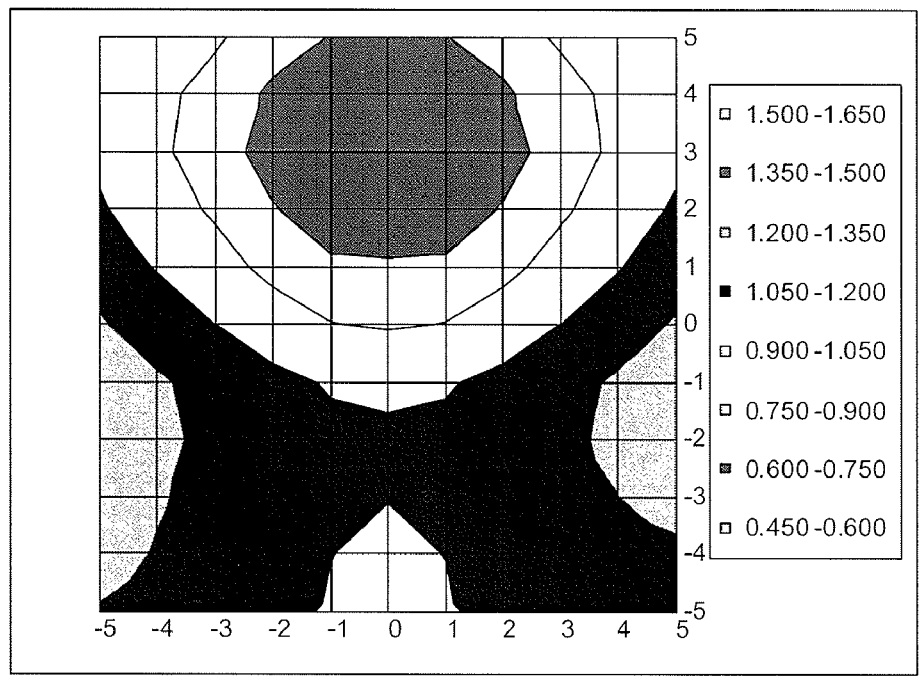
FIG. 3 is a distribution view of the support area on the TFT under the following conditions in the prior art: the diameters of the primary photo spacers are 12 μm, all of the primary photo spacers are at the same prescribed location, and the alignment accuracy of the primary photo spacers is 5 μm.
Figure 4:
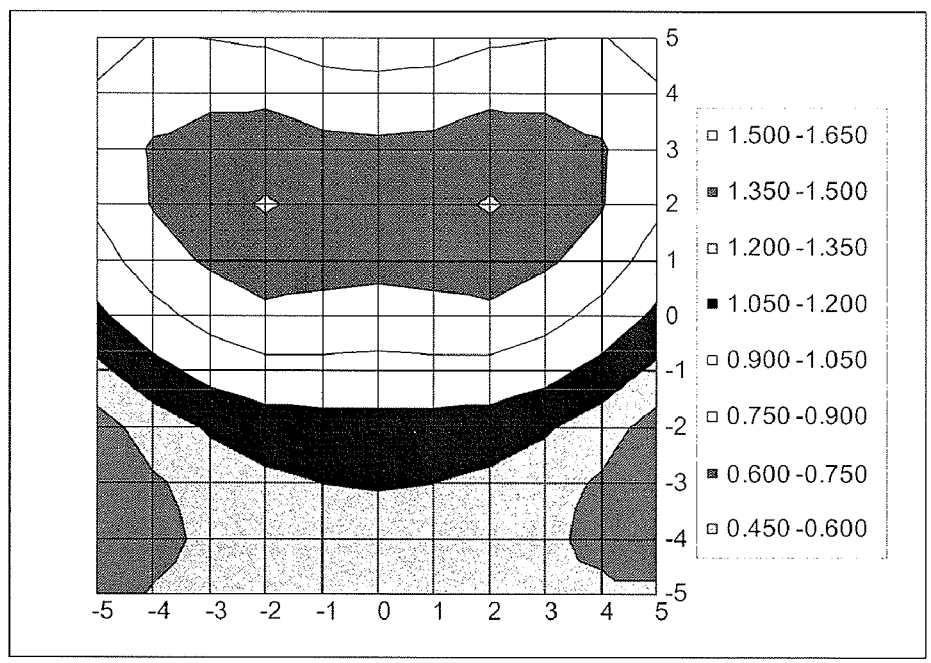
FIG. 4 is a distribution view of the support area on the TFT under the following conditions in the prior art: the diameters of the primary photo spacers are 10 μm, all of the primary photo spacers are at the same prescribed location, and the alignment accuracy of the primary photo spacers is 5 μm.
Figure 5:
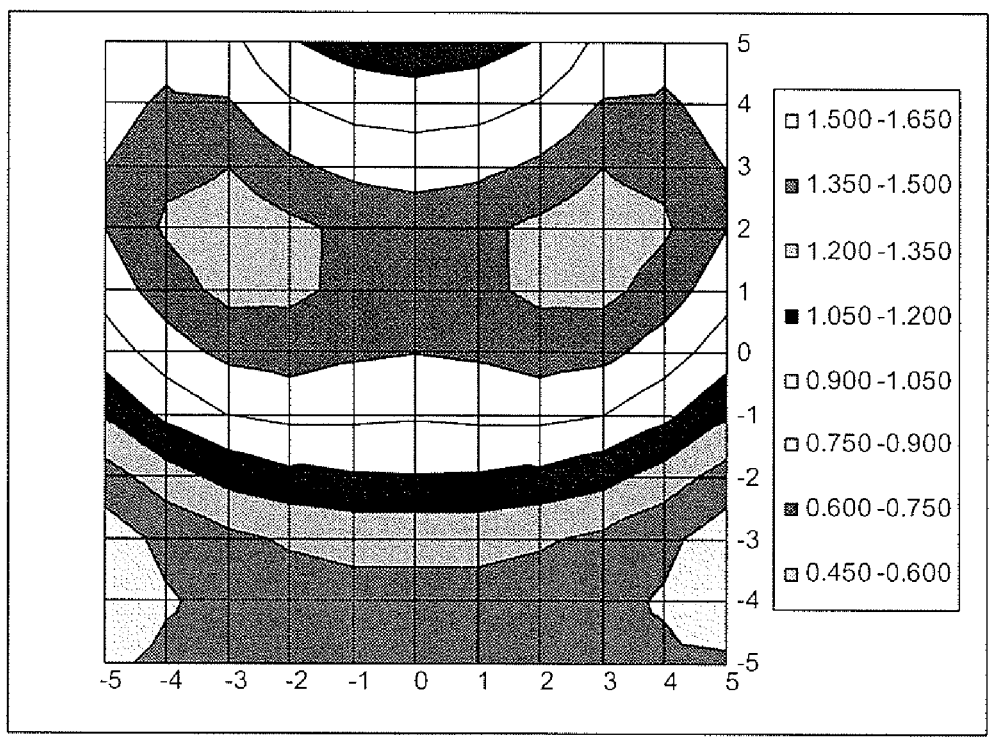
FIG. 5 is a distribution view of the support area on the TFT under the following conditions in the prior art: the diameters of the primary photo spacers are 9 μm, all of the primary photo spacers are at the same prescribed location, and the alignment accuracy of the primary photo spacers is 5 μm.

The embodiment provides a variety of liquid crystal display panels, and the liquid crystal display panel includes an array substrate and a color filter substrate bonded together, wherein, primary photo spacers are provided on the color filter substrate, and the top end of the primary photo spacer is disposed at the sub-pixel of the array substrate; one or more sub-pixels corresponds to a primary photo spacer; all of the primary photo spacers are grouped into at least two sets of primary photo spacers, the primary photo spacers in each set have a same prescribed location or a same top end shape, but the primary photo spacers in different sets have different prescribed locations and different top end shapes, i.e., the primary photo spacers in the different sets may have different prescribed locations or the different top end shapes. The number of the primary photo spacers at the different prescribed locations may also be different. The prescribed location refers to the positions at which the primary photo spacer on the color filter substrate is located in the sub-pixels in the array substrate.

With the above structure, since the different primary photo spacers are at the different prescribed locations, the influence by the primary photo spacers in the different prescribed locations will compensate for each other within the range of the process tolerance when the array substrate and the color filter substrate are bonded, so as to keep the contact area between the primary photo spacers and the array substrate unchanged, therefore the effect for maintaining the uniformity of the cell thickness by the primary photo spacers will be ensured, and the uniformity of the cell thickness is improved, at the same time, the occurrence of the local stress between the primary photo spacer and the array substrate in the panel will decrease, and the quality problems such as the touch mura will be effectively decreased.

The above prescribed location for the primary photo spacers is described hereinafter in connection with several embodiments.

The First Embodiment

According to the embodiment, there is provided a 17-inch SXGA panel. In the embodiment, the basic size of the sunpixel is 88 μm×264 μm. The TFT channel employs a design of straight line type, the width of which is 5 μm. In order to ensure an appropriate allowable deviation of the liquid crystal drop amount, the density of the primary photo spacers is typically 1/9-1/36, i.e., there is one primary photo spacer for every 9 to 36 sub-pixels, and the size of the primary photo spacer is 6-15 μm. Square photo spacers with a length of side of 9 μm and a density of 1/24 are selected to be used to ensure a full allowable deviation for the liquid crystal drop amount. The photo spacers are grouped into two sets, i.e., a first set of primary photo spacer and a second set of primary photo spacer. Hereinafter, the primary photo spacers in the first set are referred as the first primary photo spacer 11, and the primary photo spacers in the second set are referred as the second primary photo spacer 12. The distribution of the secondary photo spacers is the same as that in the prior art.

Figure 6A:
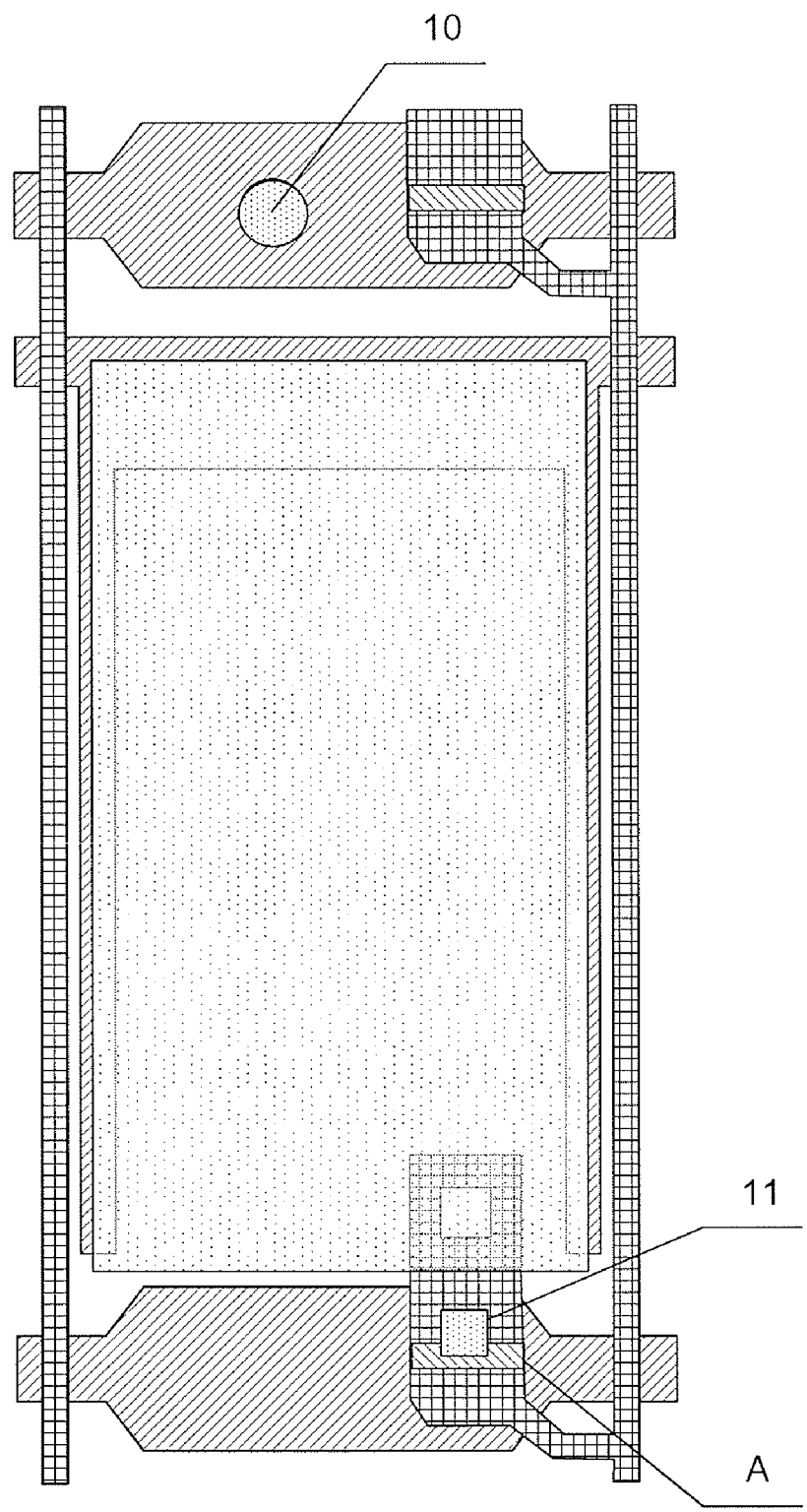
FIG. 6A is a schematic view showing the prescribed locations of a first primary photo spacer on the sub-pixel in the liquid crystal display of the first embodiment according to the invention.
Figure 6B:
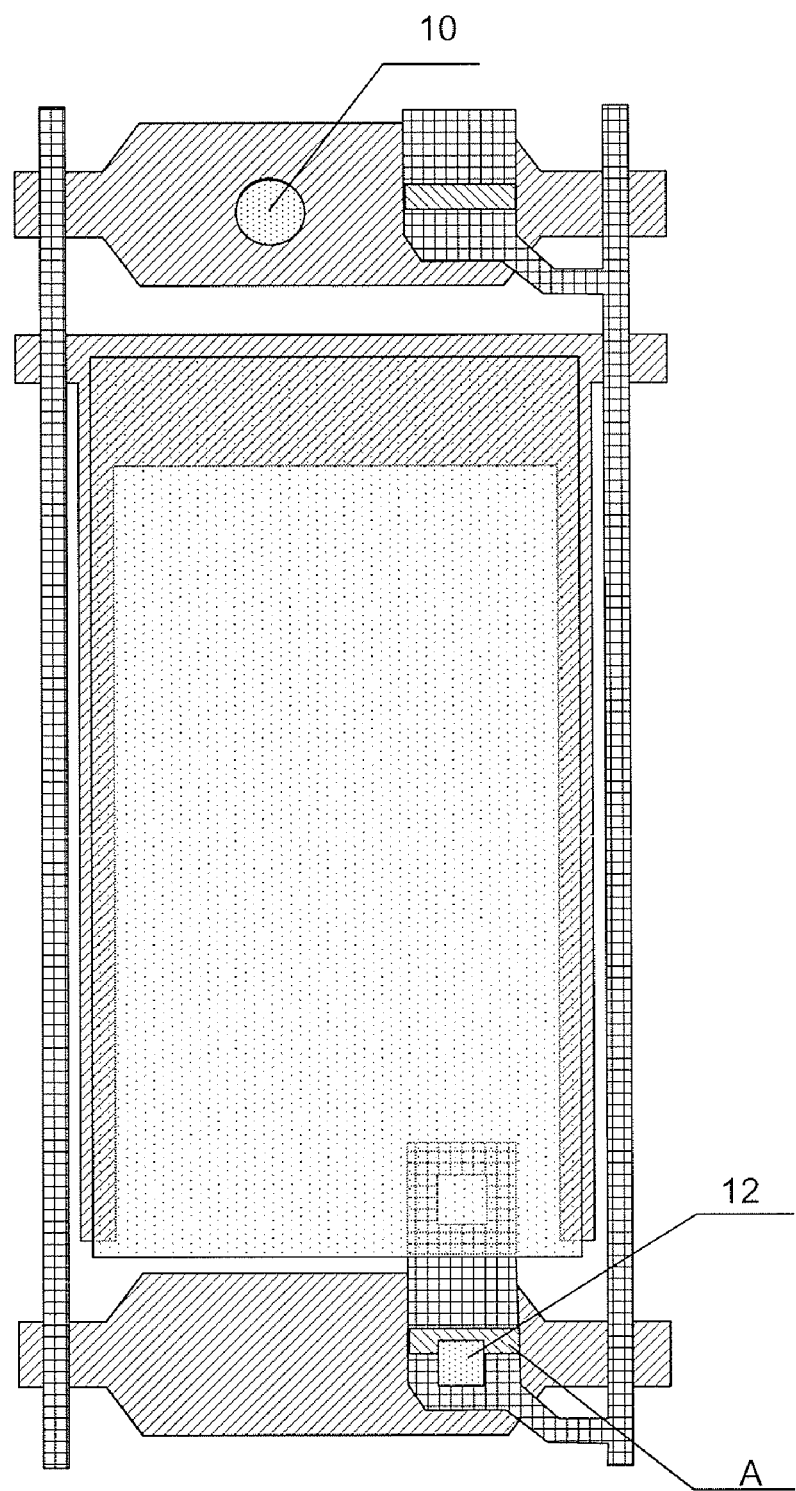
FIG. 6B is a schematic view showing the prescribed locations of a second primary photo spacer on the sub-pixel in the liquid crystal display of the first embodiment according to the invention.

FIGS. 6A and 6B are schematic views showing the prescribed locations of the first primary photo spacer and the second primary photo spacer on the sub-pixels in the liquid crystal display of the first embodiment according to the invention. The first primary photo spacer is at the upper side of the TFT channel A of the corresponding sub-pixel, and the center of the first primary photo spacer 11 is 4.5 μm upper from the center of the TFT channel, i.e., the lower side of the first primary photo spacer 11 is at the central position of the TFT channel. The second primary photo spacer 12 is at the lower side of the TFT channel of the corresponding sub-pixel, the center of the second primary photo spacer 12 is 4.5 lower from the center of the TFT channel, i.e., the upper side of the second primary photo spacer 12 is at a central position of the TFT channel.

Figure 7:
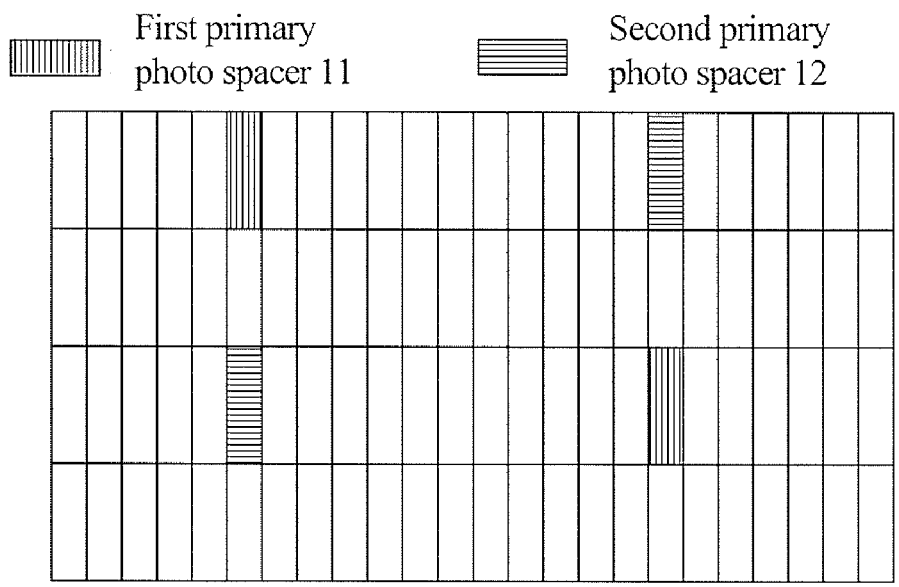
FIG. 7 is a schematic arrangement of the first and second primary photo spacers on the panel in the first embodiment according to the invention.

With the above prescribed locations for the two primary photo spacers relative to the channel A, the distribution densities of both the first and second primary photo spacers 11 and 12 are ⅟48, i.e., there is one first primary photo spacer 11 and one second primary photo spacer 12 for every 48 sub-pixels. In one row on the array substrate, the first primary photo spacer 11 and the second primary photo spacer 12 may be provided alternatively at the sub-pixels on the array substrate. In one column on the array substrate, the first primary photo spacer 11 and the second primary photo spacer 12 may be provided alternatively at the sub-pixels on the array substrate. Specifically, FIG. 7 is a schematic arrangement of the first and second primary photo spacers on the panel in the first embodiment according to the invention, in which one square represents one sub-pixel in the panel, and the squares with different shading formats represent the sub-pixels provided with the first and second primary photo spacers. The first and second primary photo spacers are provided repeatedly with a sequence of "ABAB . . . " in the horizontal direction, and with a sequence of "ABAB . . . " in the vertical direction. Therefore, a minimum distance between the first and second primary photo spacers 11 and 12 is ensured, so as to ensure the uniformity of the support force by the primary photo spacers inside the panel.

After the color filter substrate and the array substrate are bonded together, the alignment deviation inside the panel are typically within 6 μm, however, the distance between the first and second primary photo spacers 11 and 12 in the configuration shown in FIG. 7 is very small, e.g., only about 1 millimeter, therefore, the neighboring first and second primary photo spacers 11 and 12 have almost the same alignment deviation. Therefore, the neighboring first and second primary photo spacers 11 and 12 is in the range of the alignment deviation (6 μm), the variation of the actual support area due to the TFT channel will be compensated for each other, which ensure the total support area for the first and second primary photo spacers unchanged. Therefore, the uniformity of the support effect of the primary photo spacers inside the panel may be ensured, which is good for the uniformity of the cell thickness.

Figure 8:
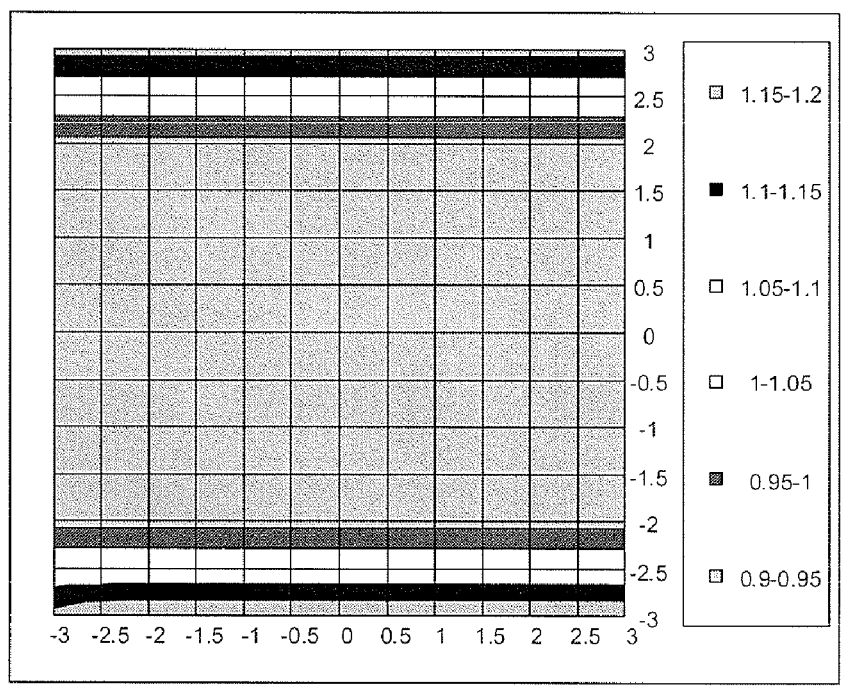
FIG. 8 is a distribution view of the actual support spacer in different alignment accuracy in the liquid crystal panel in the prior art and the first embodiment of the invention.

In order to describe the effect of the first embodiment according to the invention, a reference structure of liquid crystal panel is provided. In the reference structure of liquid crystal panel, a design in the prior art is employed and the all the primary photo spacers are provided at the same prescribed locations in the corresponding sub-pixels, and the other structure of the panel is the same as that in the first embodiment. In the reference structure of liquid crystal panel, the prescribed location of the primary photo spacer is selected as the central of the TFT channel. FIG. 8 shows a distribution view of the actual support spacer in different alignment accuracy in the liquid crystal panel in the prior art and the first embodiment of the invention, in which the horizontal ordinate and the vertical ordinate represent the alignment accuracy range for the array substrate and the color filter substrate, respectively, and the unit is micron. It can be seen from the FIG. 8 that when the design for the primary photo spacer in the prior art is employed, within an alignment accuracy of 3 μm, a deviation more than 20% will be occur as for the actual support area of the primary photo spacers. Obviously, within the alignment accuracy of 3 μm, when the technical solution of two prescribed locations in the embodiment is employed, the actual support area of the primary photo spacers will maintain unchanged by the mutual compensation effect.

The Second Embodiment

According to the second embodiment, there is provided another 17-inch SXGA panel, in which the basic size of the sub-pixel is 88 μm×264 μm. The TFT channel employs a design of "U" type, and the width of the "U" type channel is 4.5 μm. The primary photo spacers are circle in shape with a diameter of 9 μm and a density of ⅟24. In the embodiment, the primary photo spacers are grouped into three sets, i.e., a third set of primary photo spacers, a fourth set of primary photo spacers and a fifth set of primary photo spacers. Hereinafter, the primary photo spacers in the third set are referred as the third primary photo spacer 13, the primary photo spacers in the fourth set are referred as the fourth primary photo spacer 14, and the primary photo spacers in the fifth set are referred as the fifth primary photo spacer 15. The locations for the secondary photo spacer is the same as those in the prior art.

Figure 9A:
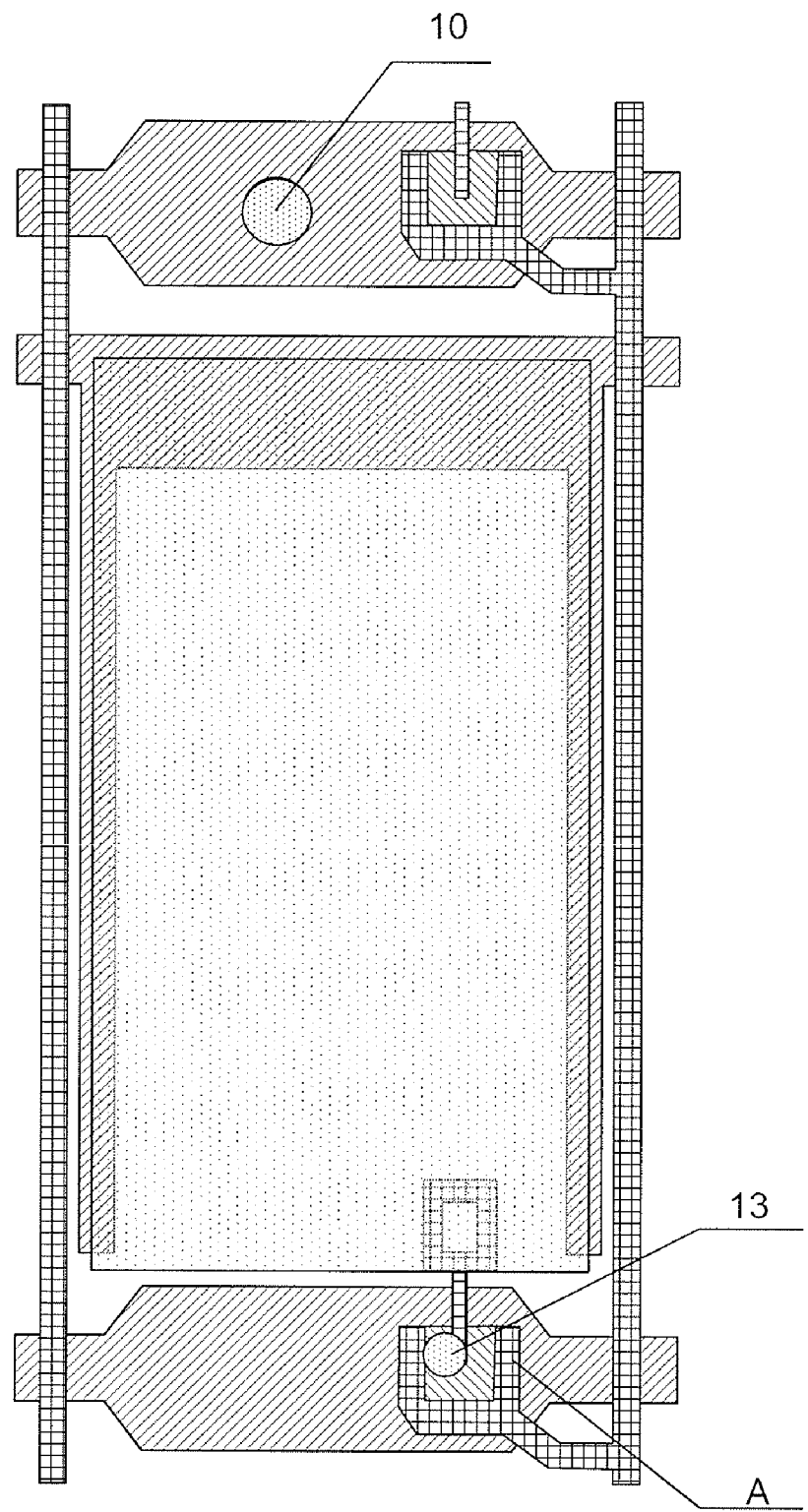
FIG. 9A is a schematic view for the prescribed locations in the sub-pixels for the third primary photo spacer in the liquid crystal display panel of the second embodiment.
Figure 9B:
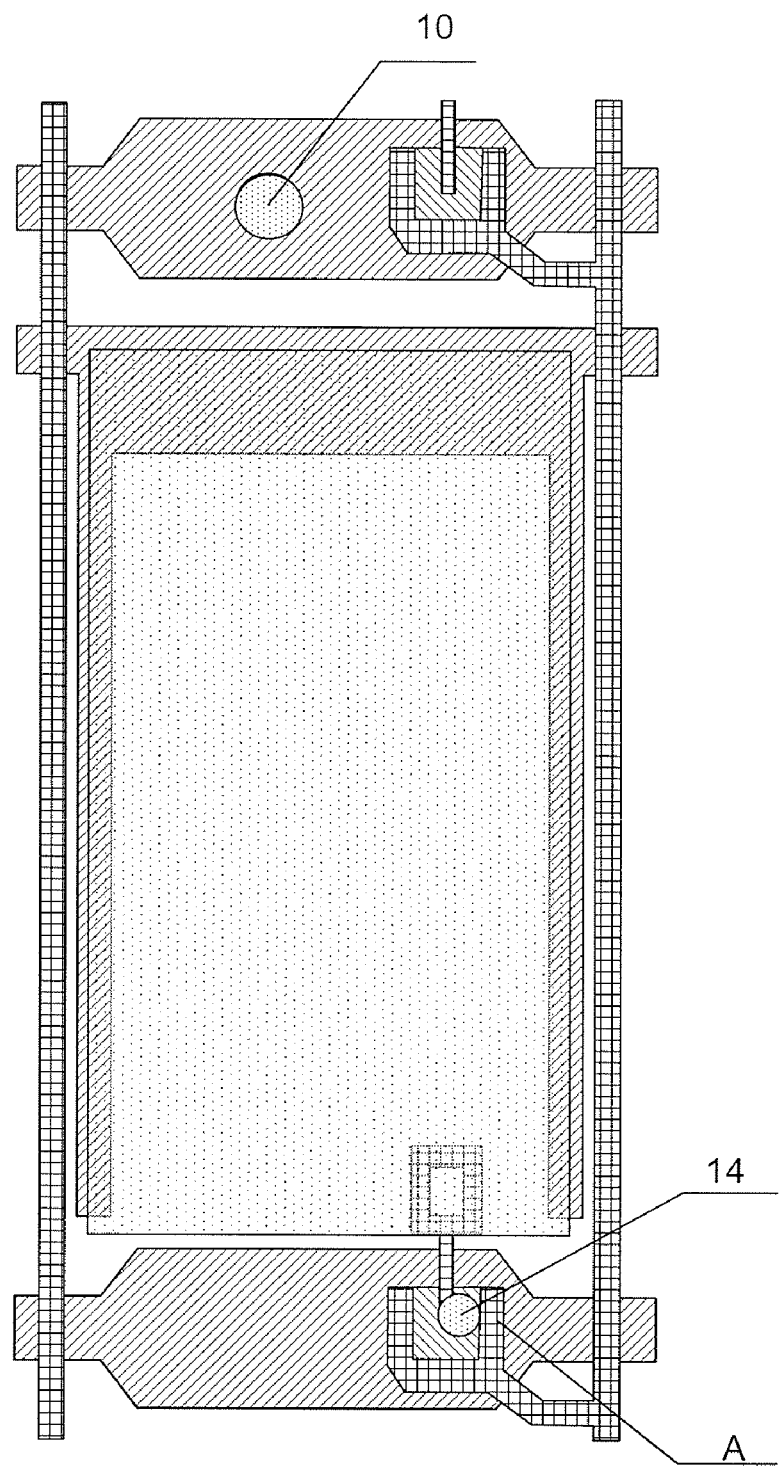
FIG. 9B is a schematic view for the prescribed locations in the sub-pixels for the fourth primary photo spacer in the liquid crystal display panel of the second embodiment.
Figure 9C:
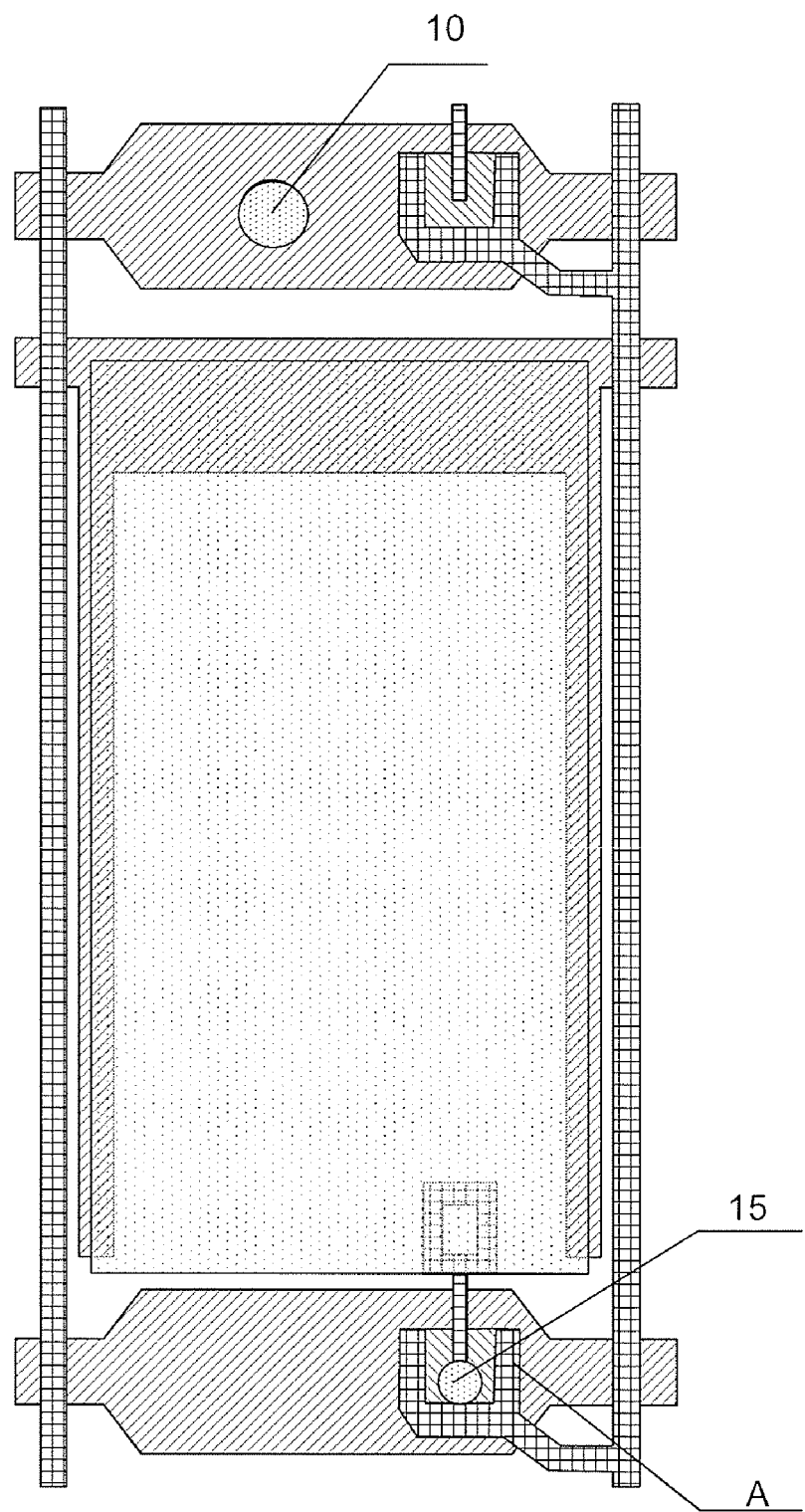
FIG. 9C is a schematic view for the prescribed locations in the sub-pixels for the fifth primary photo spacer in the liquid crystal display panel of the second embodiment.
Figure 10:
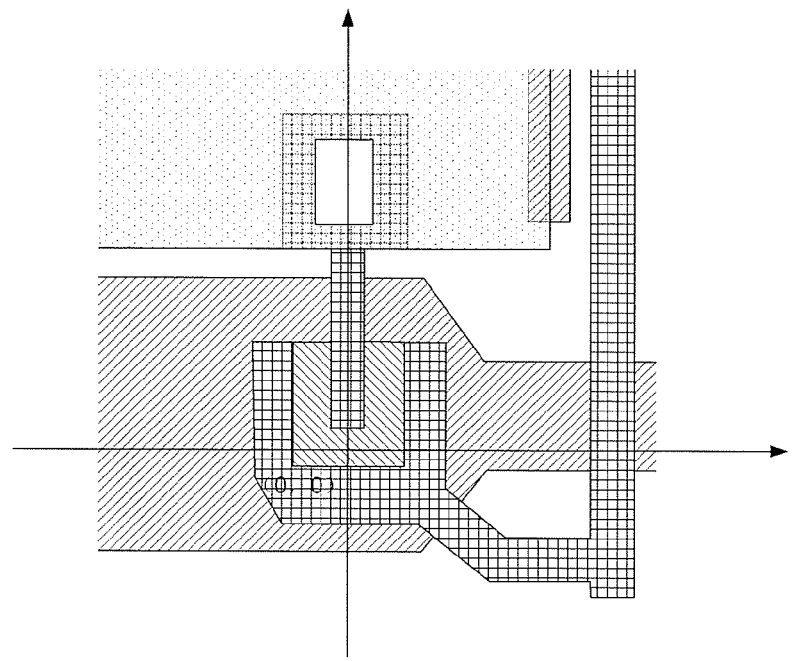
FIG. 10 is a schematic view showing the location of the primary photo spacer relative to the TFT in the liquid crystal display panel of the second embodiment according to the invention.

FIGS. 9A, 9B and 9C show schematic views for the prescribed locations in the sub-pixels for the third primary photo spacer, the fourth primary photo spacer and the fifth primary photo spacer, respectively, in liquid crystal display panel of the second embodiment according to the invention. The third primary photo spacer 13, the fourth primary photo spacer 14 and the fifth primary photo spacer 15 are at the left side, the right side and the lower side of the TFT channel of the sub-pixel, respectively. In order to describe the prescribed specific locations for the third, fourth and fifth primary photo spacers 13, 14 and 15, FIG. 10 can be referenced. FIG. 10 is a schematic view showing the location of the primary photo spacer relative to the TFT in the liquid crystal display panel of the second embodiment according to the invention, wherein, the coordinate system is set up with the center of the TFT channel as origin and the unit length of the coordinate system is 1 μm. The prescribed coordinate locations for the third, fourth, and fifth photo spacers 13, 14, and 15 are (−2, 5), (2, 5) and (0, 1), respectively.

Figure 11:
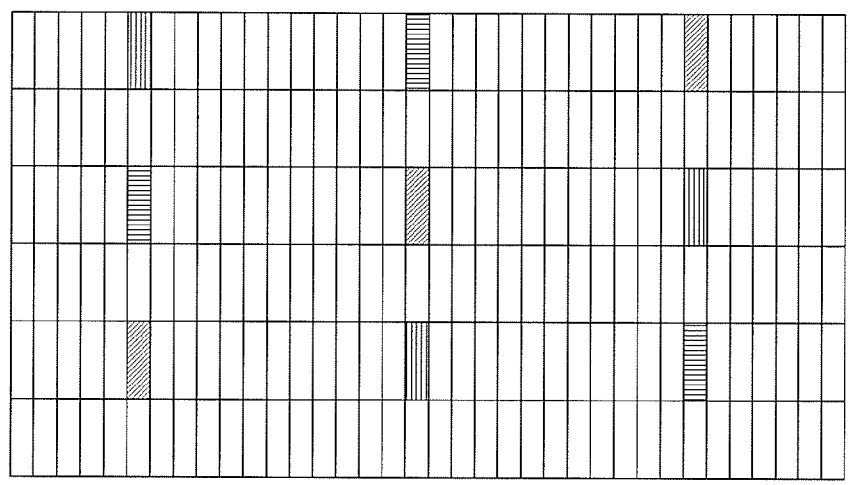
FIG. 11 is a schematic arrangement view of the third, fourth, and fifth photo spacers in the liquid crystal display panel of the second embodiment according to the invention.

In one row on the array substrate, the third primary photo spacer 13 in the third set, the fourth primary photo spacer 14 in the fourth set and the fifth primary photo spacer 15 in the fifth set can be provided in this order at the sub-pixels in the array substrate repeatedly. In one column on the array substrate, the third primary photo spacer 13 in the third set, the fourth primary photo spacer 14 in the fourth set and the fifth primary photo spacer 15 in the fifth set can be provided in this order at the sub-pixels in the array substrate repeatedly. Specifically, FIG. 11 is the schematic arrangement view of the third, fourth, and fifth photo spacers in the liquid crystal display panel of the second embodiment according to the invention, in which one square represents one sub-pixel in the panel, and the squares with different shading formats represents the sub-pixels provided with the third, fourth, and fifth photo spacers, respectively. The distribution density for each kind of primary photo spacer is ⅟72, i.e., there is one third primary photo spacer 13, one fourth primary photo spacer 14 and one fifth primary photo spacer 15 for every 72 sub-pixels. In the horizontal direction of the panel, the third, fourth and fifth photo spacers 13, 14 and 15 are repeated with a sequence of "ABCABC . . . ," and with a sequence of "ABCABC . . . ," in the vertical direction of the panel.

In order to demonstrate the effect of the second embodiment, two reference structures of liquid crystal panel are provided for the second embodiment of the invention. One of the structures is substantially the same as the second embodiment except that the prescribed locations for the primary photo spacers in the panel structure of the embodiment of the invention is changed to a single location as the prior art. For example, the selected prescribed location is (0, 0). In another structure, two locations for the prescribed locations of the primary photo spacers in the panel structure in the second embodiment of the invention are selected, and the selected prescribed locations are (−5, 3) and (5, 3), respectively.

Figure 12A:
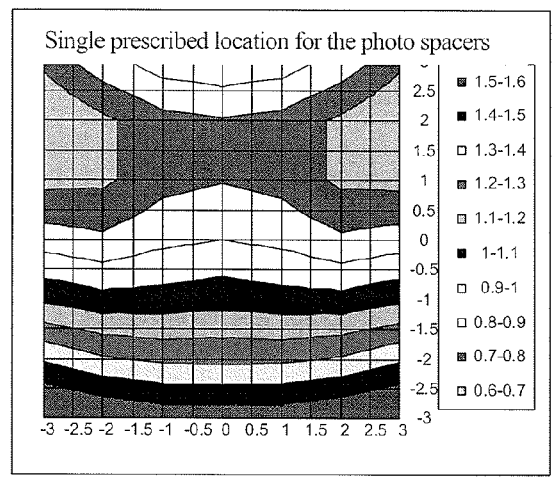
FIG. 12A is a distribution view of the actual support area of the primary photo spacers under the different alignment accuracy with the single-location design in the liquid crystal display panel in the prior art corresponding to the second embodiment of the invention.
Figure 12B:
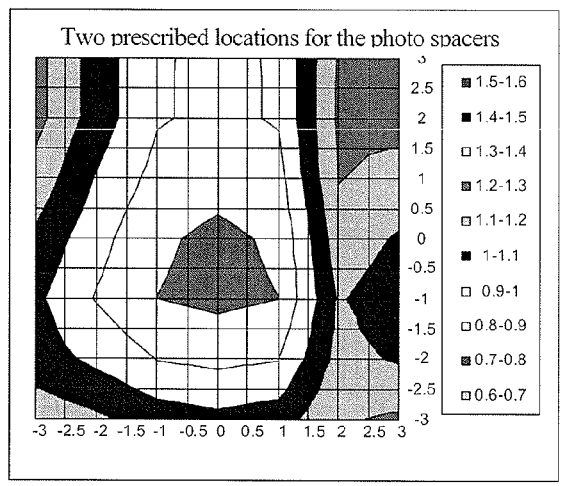
FIG. 12B is a distribution view of the actual support area of the primary photo spacers under the different alignment accuracy with the two-location design in the liquid crystal display panel corresponding to the second embodiment of the invention.
Figure 12C:
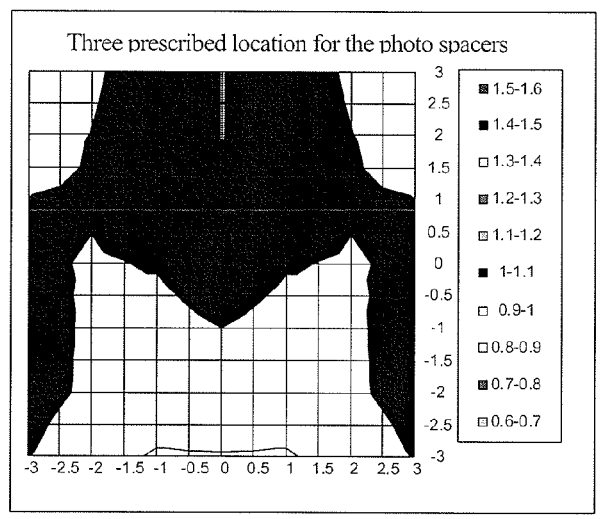
FIG. 12C is a distribution view of the actual support area of the primary photo spacers under the different alignment accuracy with the two-location design in the liquid crystal display panel of the second embodiment according to the invention.
Figure 12D:
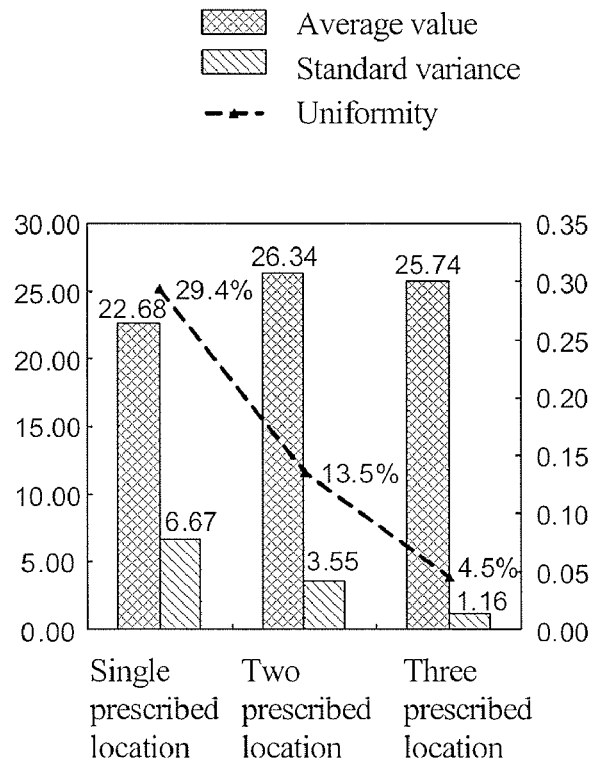
FIG. 12D is a comparative view of the uniformity of the support of the primary photo spacers in the three examples in FIGS. 12A, 12B and 12C.

FIG. 12A is a distribution view of the actual support area of the primary photo spacers under the different alignment accuracy with the single-location design in the liquid crystal display panel in the prior art and the second embodiment of the invention. FIG. 12B is a distribution view of the actual support area of the primary photo spacers under the different alignment accuracy with the two-location design in the liquid crystal display panel according to the second embodiment of the invention. FIG. 12C is a distribution view of the actual support area of the primary photo spacers under the different alignment accuracy with the two-location design in the liquid crystal display panel of the second embodiment according to the invention. FIG. 12D is a comparative view of the uniformity of the support of the primary photo spacers in the three examples in FIGS. 12A, 12B and 12C.

It can be seen from FIGS. 12A, 12B, 12C and 12D that when the prescribed locations are increased from one to three, the uniformity of the support of the primary photo spacers under different alignment accuracy is efficiently improved, and the fluctuation ratio (the ration between the variance and the average value) is decreased from 29.4% to 4.5%.

Figure 13:
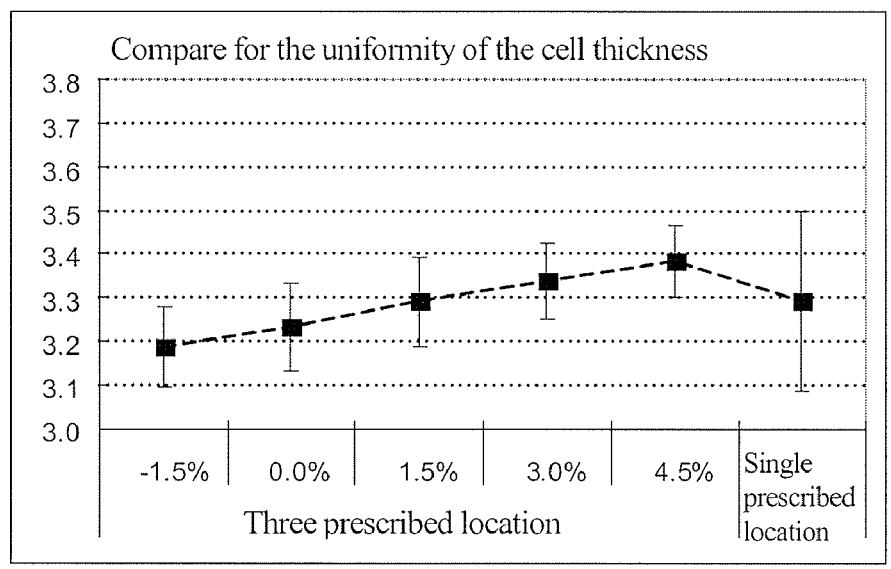
FIG. 13 is a comparative view of the uniformity of the cell thickness for the liquid crystal display panel with the single prescribed location for the primary photo spacers in the prior art and the liquid crystal display panel of the second embodiment.
Figure 14A:
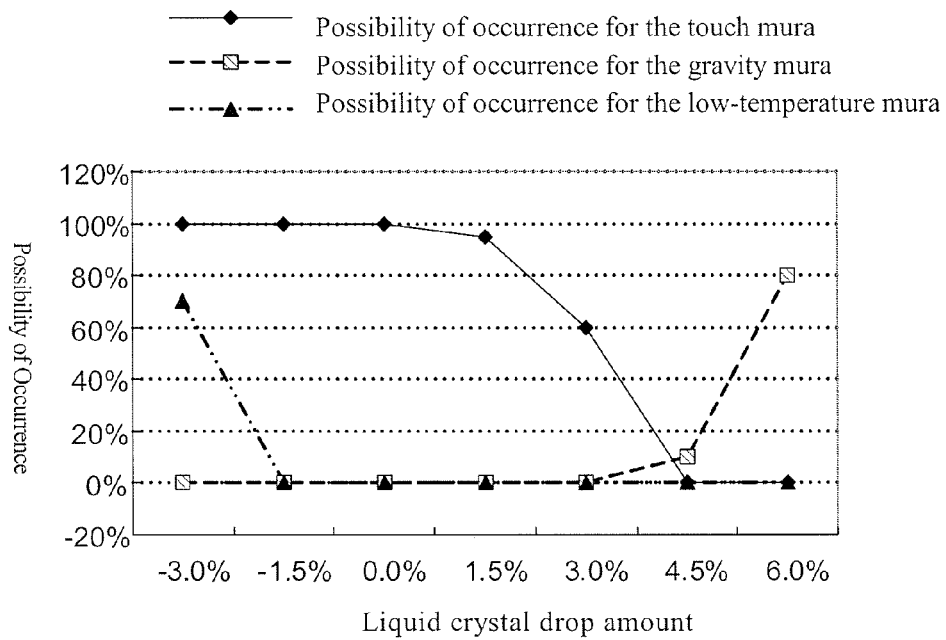
FIG. 14A is a schematic relationship view between the liquid crystal drop amount and the possibility of occurrence of the touch mura, the gravity mura and the low-temperature mura in the liquid crystal display panel with the single prescribed location for the primary photo spacers in the prior art.
Figure 14B:
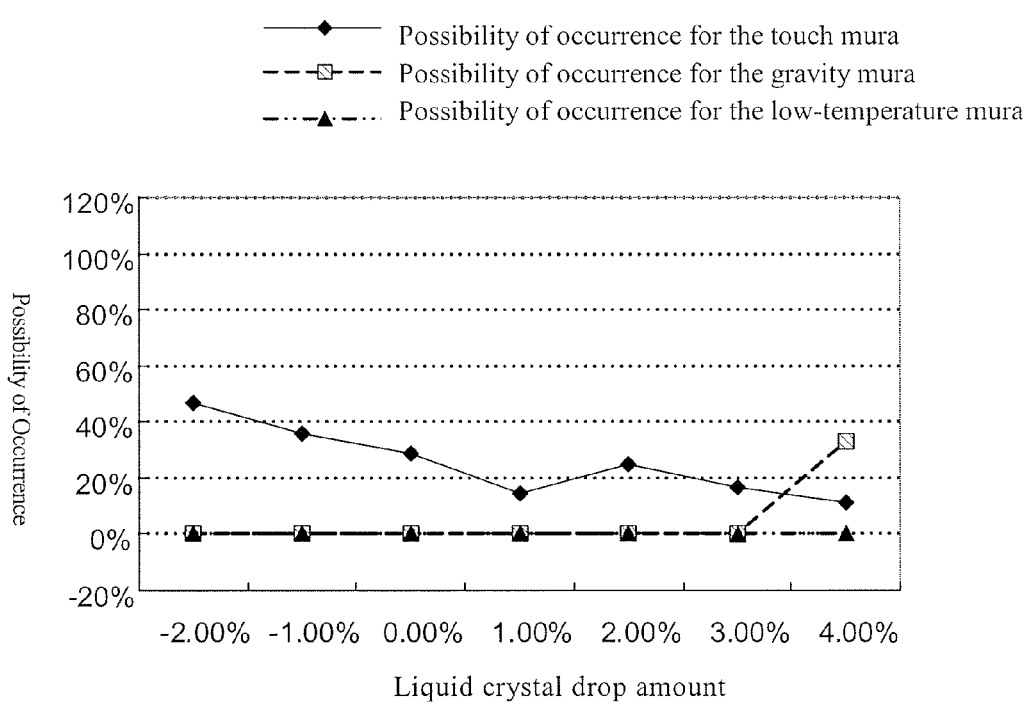
FIG. 14B is a schematic relationship view between the liquid crystal drop amount and the possibility of occurrence of the touch mura, the gravity mura and the low-temperature mura in the liquid crystal display panel with the three prescribed locations for the primary photo spacers in the second embodiment of the invention.

In order to further demonstrate the effect of the second embodiment, the liquid crystal display panel with the single prescribed location for the primary photo spacers in the prior art and the panel of the second embodiment are respectively examined with the uniformity test of the cell thickness, the touch mura test and the allowable deviation test of the liquid crystal drop amount. FIG. 13 is a comparative view of the uniformity of the cell thickness for the liquid crystal display panel with the single prescribed location for the primary photo spacers in the prior art and the liquid crystal display panel of the second embodiment. It can be seen from FIG. 13 that after the design of the three prescribed locations for the primary photo spacers is employed, the uniformity of the cell thickness is obviously improved and the range of the deviation of the cell thickness is reduced from 0.2 μm to 0.1 μm, and the uniformity of the cell thickness can be maintained with a wide range of the liquid crystal drop amount. FIG. 14A is a schematic relationship view between the liquid crystal drop amount and the possibility of occurrence of the touch mura, the gravity mura and the low-temperature mura in the liquid crystal display panel with the single prescribed locations for the primary photo spacers in the prior art. FIG. 14B is a schematic relationship view between the liquid crystal drop amount and the possibility of occurrence of the touch mura, the gravity mura and the low-temperature mura in the liquid crystal display panel with the three prescribed locations for the primary photo spacers in the second embodiment of the invention. It can be seen from FIGS. 14A and 14B that when the primary photo spacers employ the single prescribed location, the allowable deviation of the liquid crystal drop is lower than 1.5%, i.e., only when the liquid crystal drop amount is within an accuracy of 1.5% (the liquid crystal amount between 3% and 4.5%), the produced panel can be free of the problems of the gravity mura, the low-temperature mura, and the possibility of occurrence of the touch mura is in an allowable range (below 50%). However, as for the design of three prescribed locations for the primary photo spacer in the second embodiment of the invention, the allowable deviation of the liquid crystal drop amount is more than 5%, i.e., when the liquid crystal drop accuracy is in a range of −2% to +3%, the produced panel can be ensured to be free of the problems such as the gravity mura and the low-temperature mura, and at the same time, the possibility of occurrence of the touch mura is further decreased (50%-20%).

By increasing the prescribed location for the primary photo spacers from one to three, the uniformity of the cell thickness is substantially increased, and the allowable deviation of the liquid crystal drop amount is substantially increased, and at the same time, the phenomenon of the touch mura is greatly improved.

The Third Embodiment

Figure 15:
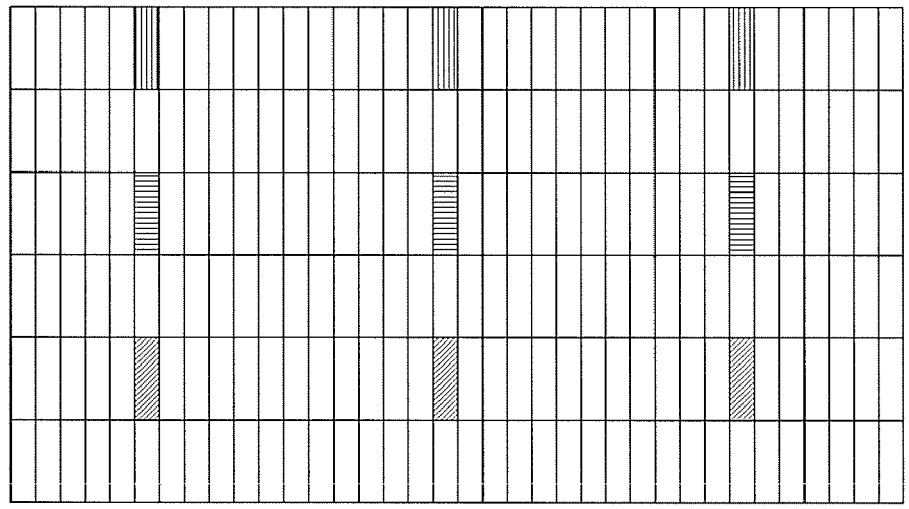
FIG. 15 is an arrangement view of the third, fourth and fifth primary photo spacers on the panel in the liquid crystal display panel of the third embodiment according to the invention.

According to the third embodiment, there is provided another structure of the liquid crystal display panel same as the second embodiment, except that the arrangement for the three kinds of primary photo spacers on the array substrate is different. In one row on the array substrate, one of the third primary photo spacer 13 in the third set, the fourth primary photo spacer 14 in the fourth set and the fifth primary photo spacer 15 in the fifth set is provided at the sub-pixels in the array substrate. In one column on the array substrate, the third primary photo spacer 13 in the third set, the fourth primary photo spacer 14 in the fourth set and the fifth primary photo spacer 15 are provided at the sub-pixels in the array substrate repeatedly. Specifically, FIG. 15 is a arrangement view of the third, fourth and fifth primary photo spacers on the panel in the liquid crystal display panel of the third embodiment according to the invention, in which, the three kinds of primary photo spacers are repeated in a sequence of "ABCA BC . . . " in the vertical direction, but they employ a single arrangement sequence of "AAA . . . ", "BBB . . . " or "CCC . . . " instead of the repeating arrangement sequence in the horizontal direction. Such an arrangement form can reduce amount of data during the mask design efficiently to ⅔ of that of the second embodiment, while the uniformity of the support of the primary photo spacer can be maintained, similar to that of the second embodiment.

The Fourth Embodiment

Figure 16A:
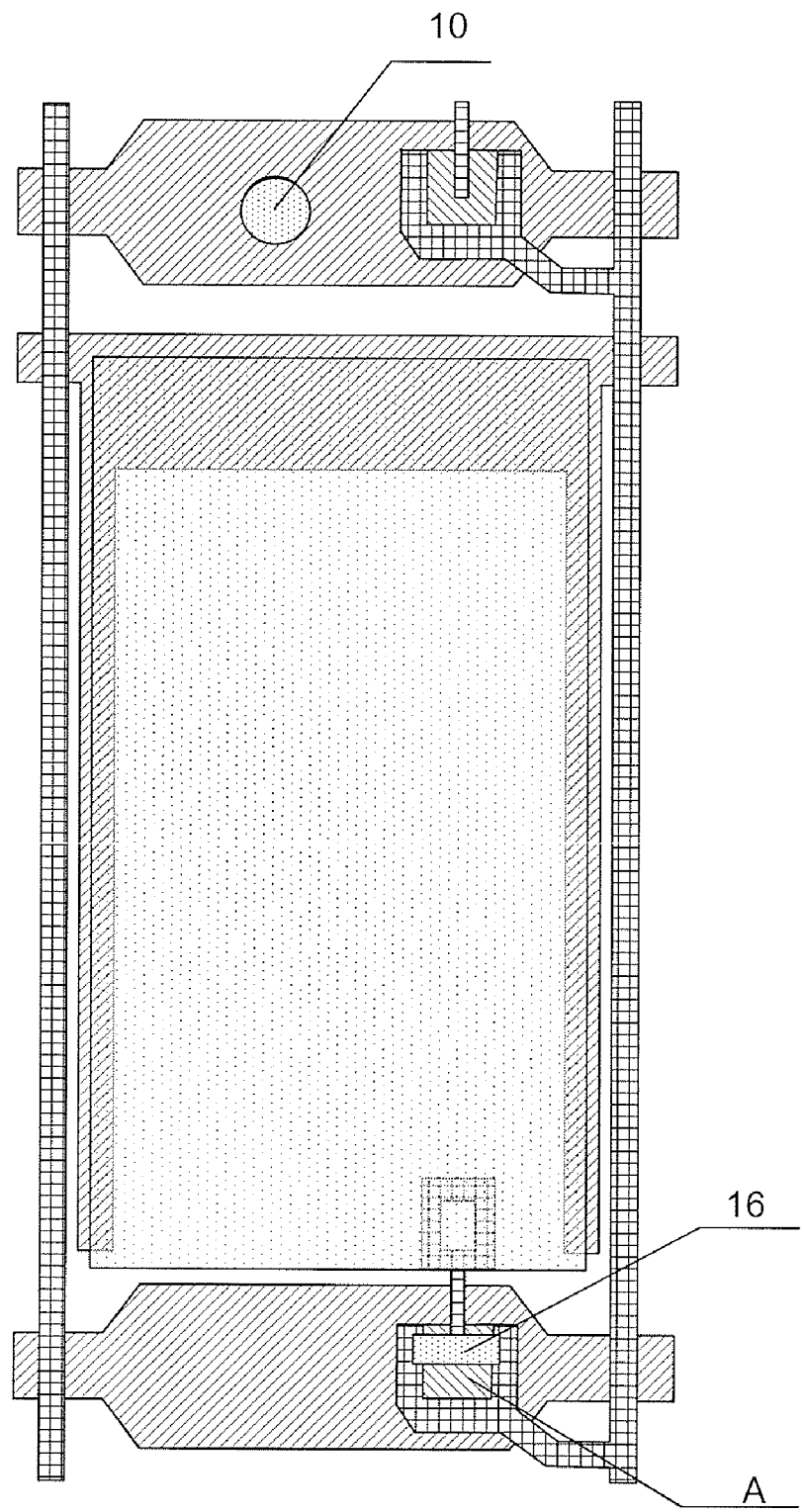
FIG. 16A is a schematic view for the prescribed location on the sub-pixel for the sixth primary photo spacer in the liquid crystal display panel of the fourth embodiment of the invention.
Figure 16B:
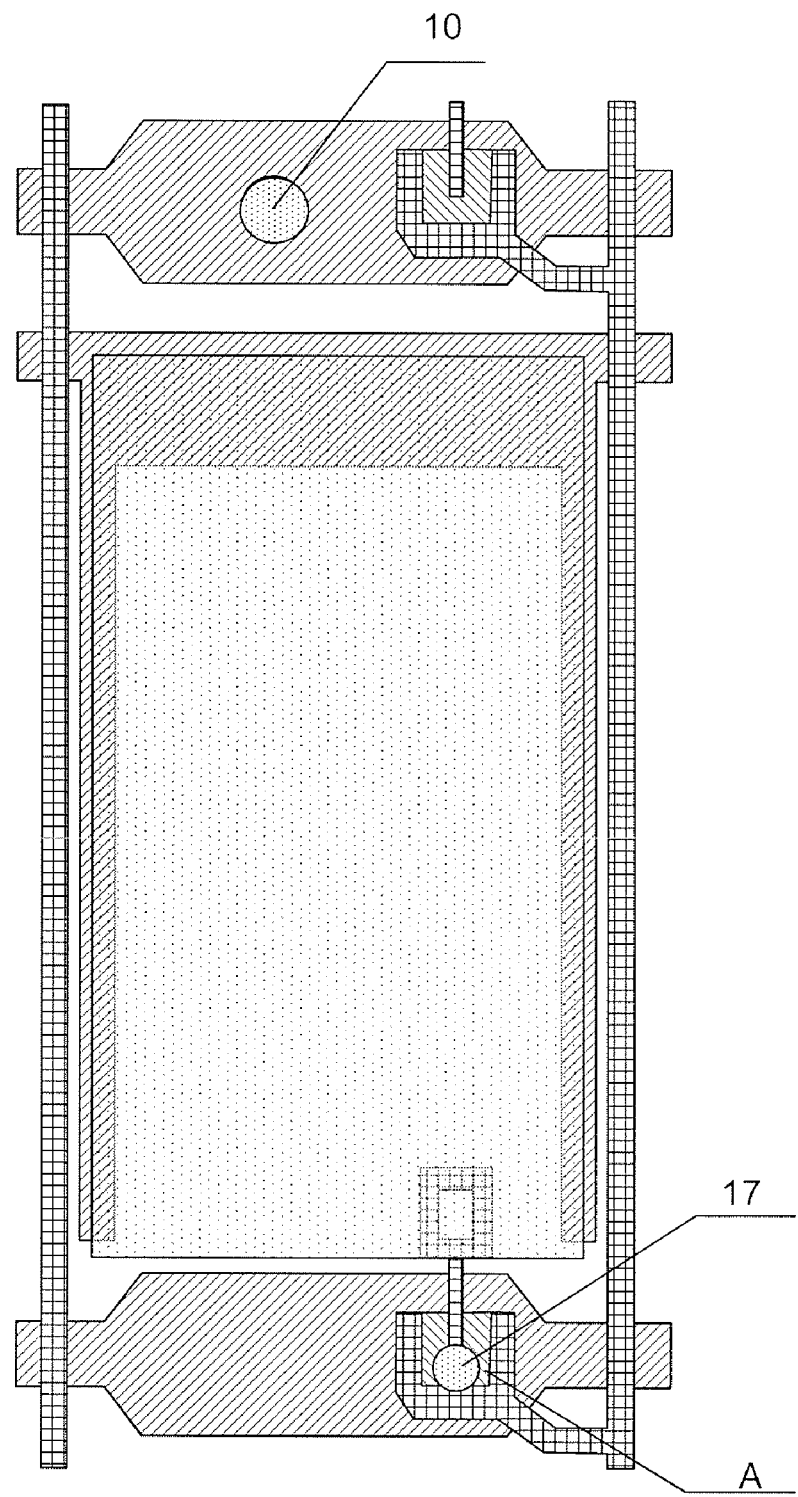
FIG. 16B is a schematic view for the prescribed location on the sub-pixel for the seventh photo spacer in liquid crystal display panel of the fourth embodiment of the invention.

The embodiment of the invention provides another structure for the liquid crystal display panel. The basic structure of the liquid crystal display panel is different from that of the second embodiment in that the arrangement of the primary photo spacer is different. The primary photo spacers are grouped into two sets in the fourth embodiment. The first set is at the upper side of the TFT channel with a rectangular shape of 7 μm×15 μm, the primary photo spacers in the first set will be referred as the sixth primary photo spacer 16. The second set is at the lower side of the TFT channel with a circle structure with a diameter of 8 μm, the primary photo spacers in the second set are referred as the seventh primary photo spacer 17. FIGS. 16A and 16B are the schematic view for the prescribed locations on the sub-pixels for the sixth primary photo spacer and the seventh photo spacer in liquid crystal display panel of the fourth embodiment of the invention.

Figure 17:
FIG. 17 is a schematic arrangement view of the sixth primary photo spacer and the seventh photo spacer on the panel in the liquid crystal display panel of the fourth embodiment according to the invention.
Figure 17:
Figure 17:
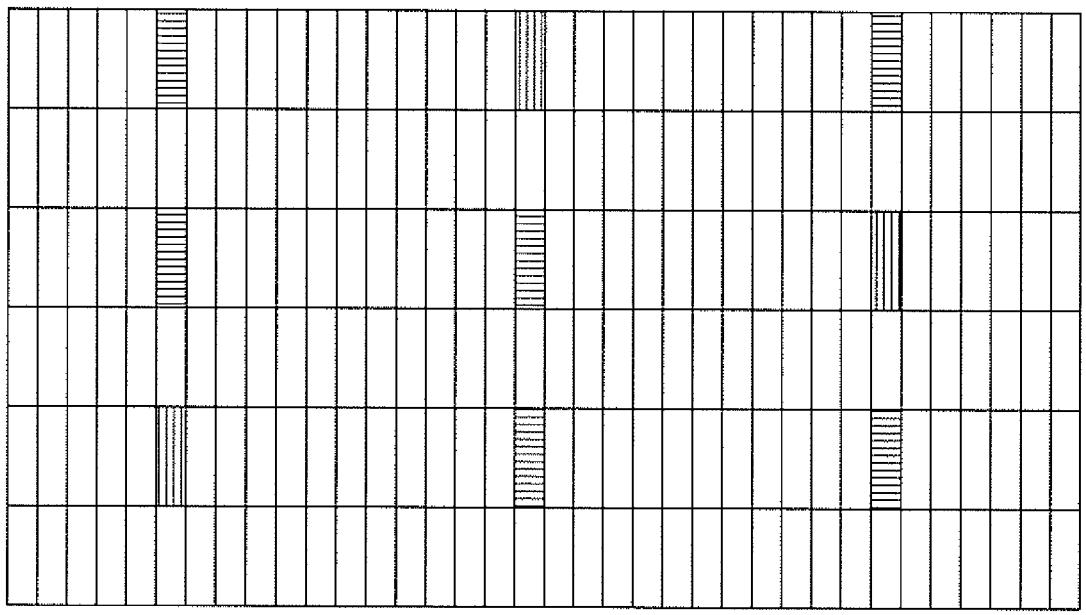

FIG. 17 is a schematic arrangement view of the sixth primary photo spacers and the seventh photo spacers on the panel in the liquid crystal display panel of the fourth embodiment according to the invention, in which, one square represents on sub-pixel in the panel, and the square with the different shading formats represent the sub-pixels for the sixth primary photo spacer and the seventh photo spacer, respectively. These two kinds of primary photo spacers have different densities, the distribution density of the sixth primary photo spacer 16 is 1/72, i.e., there is one sixth primary photo spacer 16 for every 72 sub-pixels; the distribution density of the seventh primary photo spacer 17 is 2/72, i.e., there are two seventh primary photo spacers 17 for every 72 sub-pixels.

The primary photo spacers in the example is grouped into two sets, by the different end shape, the different density, and the different prescribed locations for the different primary photo spacers, and arranging them according to the structure of FIG. 17, the uniformity of the support area of the primary photo spacers can be efficiently improved.

In each of the embodiments provided in the invention, the different primary photo spacers is provided at the different locations, therefore, if the alignment deviation occurs when the array substrate and the color filter substrate are bonded together, the influence on the primary photo spacers at the different prescribed locations will be compensated for each other, so as to ensure the minimum variation of the overall contact area between the primary photo spacer and the array substrate, therefore, the variation of the overall support force by the primary photo spacers in the panel is minimized. At the same time, by optimizing the shape of the primary photo spacers in each set, and the arrangement form and the distribution density of the primary photo spacers in the panel, the overall uniformity can be confined to the local region of the panel, so as to improve the uniformity of the support force by the primary photo spacers inside the panel.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A liquid crystal display panel, including:
   an array substrate and a color filter substrate bonded together;
   wherein the color filter substrate is provided with primary photo spacers, and the top end of each of the primary photo spacers is provided at a sub-pixel of the array substrate,
   the primary photo spacers are grouped into at least two sets, the primary photo spacers in each set have a same prescribed location and a same top end shape; the primary photo spacers in the different sets have different prescribed locations or different top end shapes.

2. The liquid crystal display panel of claim 1, further comprising:
   secondary photo spacers provided on the color filter substrate, the top ends of the secondary photo spacers are provided at the positions with an elevation lower than that of the primary photo spacers on the array substrate.

3. The liquid crystal display panel of claim 1, wherein:
   the primary photo spacers are group into first and second sets for an array substrate having thin film transistors with a straight line type channel.

4. The liquid crystal display panel of claim 3, wherein
   each of the primary photo spacers in the first set is at the upper side of the thin film transistor channel of the corresponding sub-pixel;
   each of the primary photo spacers in the second set is at the lower side of the thin film transistor channel of the corresponding sub-pixel.

5. The liquid crystal display panel of claim 4, wherein
   in one row on the array substrate, the primary photo spacers in the first set and the primary photo spacers in the second set are provided at the sub-pixels of the array substrate alternatively;
   in one column on the array substrate, the primary photo spacers in the first set and the primary photo spacers in the second set are provided at the sub-pixels of the array substrate alternatively.

6. The liquid crystal display panel of claim 1, wherein
   the primary photo spacers are group into a third, fourth and fifth set for the array substrate having thin film transistors with a "U" type channel.

7. The liquid crystal display panel of claim 6, wherein
   each of the primary photo spacers in the third set is at the left side of the thin film transistor channel of the corresponding sub-pixel;
   each of the primary photo spacers in the fourth set is at the middle of the thin film transistor channel of the corresponding sub-pixel;
   each of the primary photo spacers in the fifth set is at the right side of the thin film transistor channel of the corresponding sub-pixel.

8. The liquid crystal display panel of claim 7, wherein
   in one row on the array substrate, the primary photo spacers in the third set, the primary photo spacers in the fourth set and the primary photo spacers in the fifth set are provided at the sub-pixels of the array substrate in this order repeatedly;
   in one column on the array substrate, the primary photo spacers in the third set, the primary photo spacers in the fourth set and the primary photo spacers in the fifth set are provided at the sub-pixels of the array substrate in this order repeatedly.

9. The liquid crystal display panel of claim 7, wherein
   in one row on the array substrate, one of the primary photo spacers in the third set, the primary photo spacers in the fourth set and the primary photo spacers in the fifth set are provided at the sub-pixels of the array substrate;
   in one column on the array substrate, the primary photo spacers in the third set, the primary photo spacers in the fourth set and the primary photo spacers in the fifth set are provided at the sub-pixels of the array substrate in this order repeatedly.

10. The liquid crystal display panel of claim 1, wherein
    the numbers of the primary photo spacers in the different sets are different.

11. The liquid crystal display panel of claim 2, wherein
    the numbers of the primary photo spacers in the different sets are different.

12. The liquid crystal display panel of claim 5, wherein
    the numbers of the primary photo spacers in the different sets are different.

13. The liquid crystal display panel of claim 8, wherein
    the numbers of the primary photo spacers in the different sets are different.

14. The liquid crystal display panel of claim 9, wherein
    the numbers of the primary photo spacers in the different sets are different.

* * * * *